Oct. 10, 1950   N. F. ANDREWS   2,525,058
CORN PICKER HARVESTER

Filed Feb. 16, 1948   2 Sheets-Sheet 1

INVENTOR.
NORMAN F. ANDREWS
BY
ATTORNEYS

Oct. 10, 1950 — N. F. ANDREWS — 2,525,058
CORN PICKER HARVESTER
Filed Feb. 16, 1948 — 2 Sheets-Sheet 2

INVENTOR.
NORMAN F. ANDREWS
BY
ATTORNEYS

Patented Oct. 10, 1950

2,525,058

UNITED STATES PATENT OFFICE 2,525,058

CORN PICKER HARVESTER

Norman F. Andrews, Moline, Ill., assignor to Deere & Company, Moline, Ill., a corporation of Illinois Application February 16, 1948, Serial No. 8,662

18 Claims. (Cl. 56—18)

This invention relates to a harvester and particularly to a harvester of the corn picker type.

The invention contemplates and has for its principal object the provision of improved means for handling crops in general and corn in particular, especially with regard to the moving of crops or corn from the gathering means to a receiving means. In a typical harvester of the corn picker type, there is usually provided a generally fore and aft extending frame structure at the forward end of which is gathering and snapping mechanism including snapping rolls for snapping ears of corn from upstanding stalks; and at the rear end of the frame there is provided means for receiving the snapped ears from the gathering and snapping mechanism, the receiving means ordinarily including a plurality of husking rolls which husk the corn prior to its ultimate delivery to a suitable receptacle. Many devices have heretofore been provided for forwarding ears from the snapping mechanism to the husking mechanism and most of these have utilized endless chains or belts for the purpose of accomplishing the necessary corn delivery or elevating. According to the present invention, I provide a corn picker in which the gathering and snapping mechanism includes a pair of rearwardly and upwardly inclining snapping rolls to the rear of which is disposed a pair of rearwardly and upwardly inclined husking rolls, the axes of rotation of the husking rolls being generally parallel to but offset from the axes of rotation of the snapping rolls; and in this arrangement I provide a rotatable ear-moving means preferably in the form of an auger extending coaxially rearwardly from one of the snapping rolls and over one of the husking rolls. In addition, I provide a first elevator device including an endless conveyor which operates alongside the snapping rolls and over the other husking roll, so that the auger and first elevator operate over the husking rolls to provide means for forwarding ears of corn along the husking rolls to be husked thereby.

A further object of my invention has to do with the provision of improved driving means for the gathering and snapping mechanism, for the husking mechanism and for the improved ear-moving means including the auger. In this respect, I preferably drive the mechanism from the rear and utilize the auger as one of the components of the driving mechanism, thereby simplifying the entire mechanism and eliminating excessive chains and shafts, all of which tends to provide a simplified harvester construction that is economical to manufacture and that may be readily adapted to vehicles of several types, the usual agricultural tractor being one example. In the adaptation of my improved harvester to an agricultural tractor, it is a further object of my invention to utilize the belt pulley of the tractor as the source of power for the harvesting and handling mechanism.

Further objects inherent in and encompassed by my invention will become apparent to those skilled in the art as the disclosure is more fully made of a preferred embodiment of the invention, such as I have illustrated in the accompanying sheets of drawings by way of example, wherein Figure 1 is a plan view of a harvester mounted on a tractor of a well known type, one of the harvester units being shown in section to reveal the interior mechanism;

Inasmuch as my invention is particularly applicable to a harvester of the corn picker type, I have so illustrated and will so describe it. However, it should be understood that many of the principles of the invention are applicable to harvesters of other types and that on the basis of the precise details illustrated, those skilled in the art will be able to accomplish the adaptation of the invention to such other harvesters. It is not desired, therefore, that the invention be limited to the structure disclosed.

Figure 1:
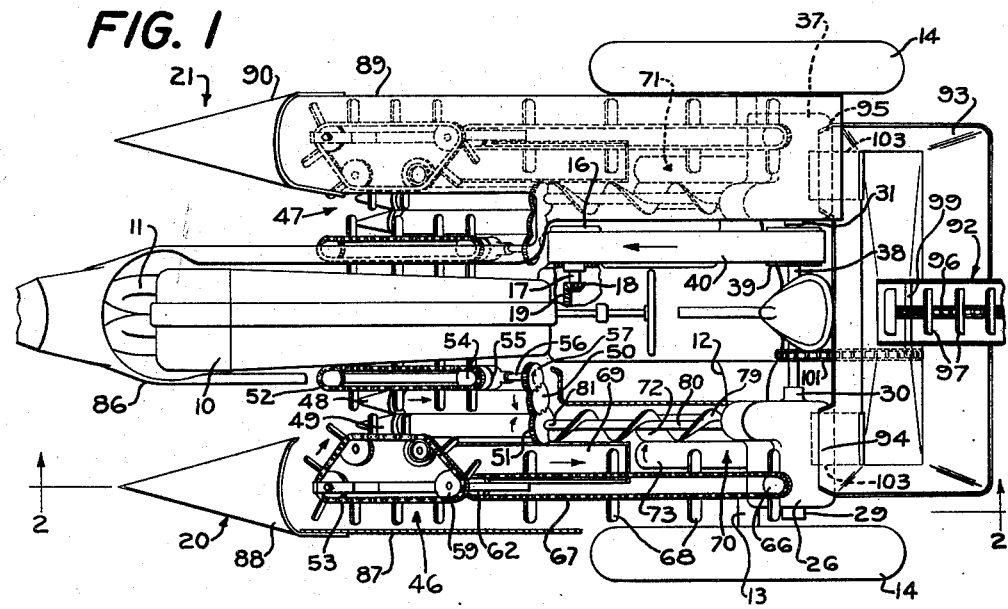

Although the invention may be used in connection with harvesters of the type drawn behind or propelled ahead of vehicles, I prefer to illustrate same in connection with a harvester of the type that is mounted directly on the tractor. For this purpose, I have shown in the drawings a tractor of a well known type including a general longitudinally extending body portion 10 carried on a steerable front truck 11 and on a transverse rear axle structure including opposite transversely extending axle housing portions 12 (Figure 3), each of which carries a drive axle 13 on which is mounted a traction wheel 14. The traction wheels are relatively widely spaced apart so as to provide an appreciable space at each side of the tractor body between each of the rear wheels. The tractor is shown as being powered by the usual internal combustion engine, indicated in dotted lines at 15 (Figure 2), and further includes a power take-off source in the form of a belt pulley 16 (Figure 1) rotatable on an axis transverse to the longitudinal center line of the body 10. In Figure 1 an intermediate portion of the rear part of the body 10 has been illustrated as broken away to reveal a transverse shaft 17 to the outer end of which the pulley 16 is keyed and to the inner end of which is keyed a bevel pinion 18. The pinion 18 meshes with a pinion 19 which is driven through conventional gearing from the engine 15, all of which is generally conventional.

Figure 3:
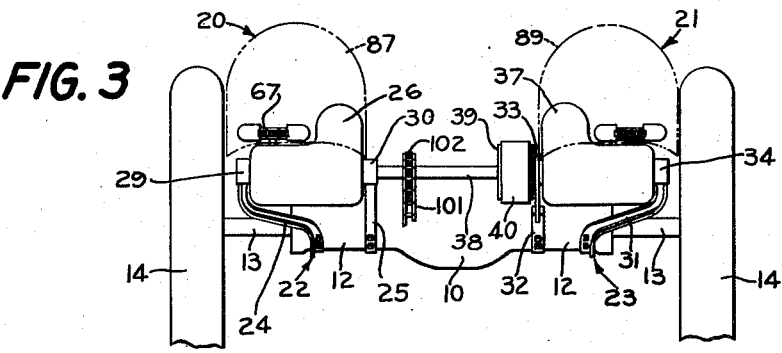
Figure 3 is a general rear view, partly in section, as viewed along the line 3—3 of Figure 2.
Figure 4:
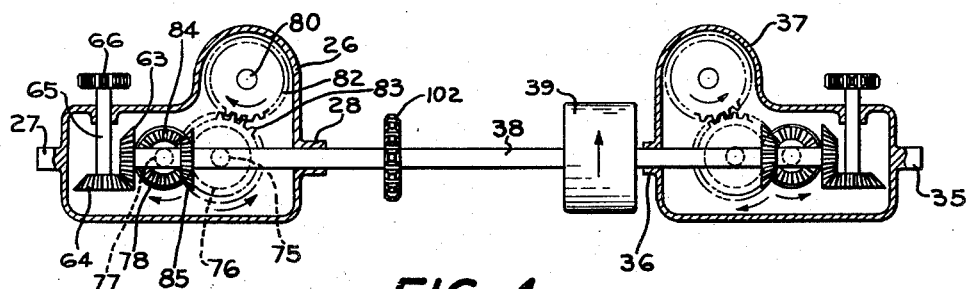
Figure 4 is an enlarged fragmentary rear view of the driving mechanism, particularly the portion thereof that includes the gear housings, the housings being shown in section to reveal the gearing therein.

Mounted directly on the tractor body are a left hand harvesting unit 20 and a right hand harvesting unit 21. The means for mounting the units 20 and 21 on the tractor preferably utilizes the transverse rear axle housing 12 and for this purpose I have provided transversely spaced and upwardly and rearwardly extending supporting structures 22 and 23 respectively for the harvesting units. The supporting structure 22 includes a pair of transversely spaced upwardly extending supporting members 24 and 25 (Figure 3) at the upper ends of which is carried a gear housing or casing 26. As best shown in Figure 4, the housing or casing is provided at opposite sides with bearings or trunnions 27 and 28 aligned on a common transverse axis and carried by suitable bearings 29 and 30 at the upper ends of the supporting members 24 and 25, respectively.

The other supporting structure 23 is similar in construction and includes a pair of transversely spaced, upwardly extending supporting members 31 and 32 provided at their upper ends, respectively, with bearings 33 and 34 for receiving transversely spaced bearings or trunnions 35 and 36 on a gear casing or housing 37. The supporting structures 22 and 23 and gear casings or housings 26 and 37 are symmetrical, although in reverse order on the rear portion of the tractor. The two housings are in transverse alignment and the bearings or trunnions 27, 28, 35 and 36 are on a common transverse axis which provides a pivot axis for the harvesting units 20 and 21, the details of which will presently appear. The inner bearings 28 and 36 respectively on the housings 26 and 37 are hollow for the purpose of carrying a transverse input or drive shaft 38 which extends transversely across between the housings and has opposite end portions respectively entering the housings. This shaft carries thereon a belt pulley 39 in fore and aft alignment with the tractor belt pulley 16. A flat belt 40 is trained about the pulleys 16 and 39 for the purpose of driving the latter from the former, the direction of travel of the belt and pulleys being indicated by arrows in Figures 1 and 4.

Each of the housings 26, 37 is provided with means for carrying a generally fore and aft extending frame structure for the respective harvesting units. Since these structures are symmetrical, only the left hand structure will be described. The housing 26 has projecting from a forward portion thereof (Figure 2) a socket portion 41 (see also Figure 6) which receives a downwardly and forwardly inclining frame member 42 here shown as being tubular in cross section. The upper end of the member 42 may be secured within the socket 41 of the housing 26 by any suitable means, so that the frame member is carried by the housing for vertical movement about the transverse axis through the bearings or trunnions 27 and 28 on the housings. The forward or lower end of the member 42 is provided with a ground engaging shoe 43 which may be of any conventional construction. The member 42 is paralleled for part of its forward extent by a second member 44 (Figure 5) and the two members are cross connected intermediate their ends by a transverse member 45. The particular frame structure illustrated forms no part of the present invention except in so far as it provides means for supporting the mechanism to be hereinafter described. This frame structure may be replaced by any suitable structure that accomplishes the necessary purposes.

Figure 5:
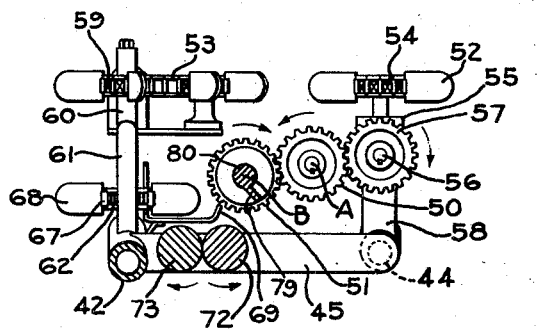
Figure 5 is an enlarged fragmentary sectional view taken generally along the line 5—5 of Figure 2.
Figure 6:
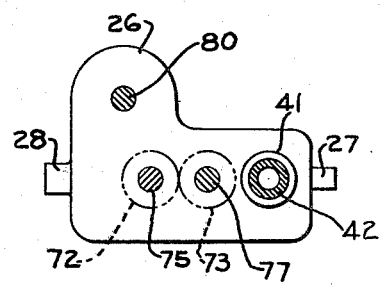
Figure 6 is an enlarged fragmentary sectional view taken substantially along the line 6—6 of Figure 2.

The frame structure including the members 42 and 44 serves as means for mounting thereon a gathering and snapping mechanism, indicated generally by the numeral 46, for the left hand harvesting unit 20. Similar mechanism is provided for the right hand unit 21 and is designated generally by the numeral 47 (Figure 1). The gathering and snapping mechanism for each unit includes a pair of parallel longitudinally, rearwardly and upwardly extending snapping rolls 48 and 49, the former being the inner snapping roll and the latter being the outer snapping roll with respect to the center line of the tractor body 10. These snapping rolls are slightly offset vertically as is conventional, and as illustrated in Figure 5, where the letter A designates the rotating axis of the inner roll 48 and the letter B designates the axis of the outer roll 49. The snapping rolls are geared together at their rear ends, as at 50 and 51 (Figure 5), for rotation in opposite directions so that the tops thereof move toward each other.

The gathering and snapping mechanism further includes inner and outer gatherer chains 52 and 53, which are here shown as being of generally conventional construction. The inner chain 52 is driven from its upper end by means of a sprocket 54 which includes a short shaft that enters a gear housing 55 to be driven by suitable gearing (not shown) in turn driven by a shaft 56 rotatable on an axis inwardly of and parallel to the rotating axis of the inner snapping roll 48. The shaft 56 has keyed thereto a gear 57 which is in constant mesh with the gear 50 on the inner snapping roll (Figures 1 and 5). The gear housing 55 is appropriately carried at 58 on the inner frame member 44 (Figure 5).

The outer gathering chain 53 includes a plurality of appropriate idler sprockets and an upper driving sprocket 59 which is rotatable on an axis extending upwardly from and normal to the outer frame member 42. This sprocket is keyed to the upper end of a shaft (not shown) which is journaled in a bearing portion 60 of a bracket 61 carried on the frame member 42. The opposite end of the shaft (not shown) that carries the sprocket 59 has keyed thereto a lower sprocket 62. It will be seen from an examination of Figure 5 that the vertical axis through the centers of the sprockets 59 and 62 is laterally spaced outwardly from the outer snapping roll 49, so as to provide sufficient space for the mounting and operation of a first elevator mechanism to be presently described.

The shaft 38, that extends transversely between the housings or casings 26 and 37, includes at its extreme left hand end within the casing 26 a bevel pinion 63 that meshes with a bevel pinion 64 at the lower end of a generally vertically extending shaft 65. The shaft 65 is appropriately journaled in an upper wall portion of the housing and extends therethrough to have keyed thereto at its upper end a driving sprocket 66. The first elevator mechanism includes the sprockets 62 and 66 and an endless conveyor in the form of a roller chain 67 equipped with a plurality of paddles or lugs 68 of conventional construction. The arrangement between the first elevator chain 67 and snapping rolls is such that the chain runs alongside the outer snapping roll 49 with the inner flight of the chain running in an upward and rearward direction, as indicated by the arrow in Figure 1. There is provided adjacent the outer snapping roll an inclined ear trough 69 for the purpose of receiving ears as they are snapped off stalks by the snapping rolls, the trough being disposed laterally to one side of the outer snapping roll and partially below the rotating axis thereof, and the paddles or lugs on the first elevator chain are so arranged as to operate in the trough (Figure 5). This construction is generally conventional and is illustrated here as only a representation of one of many forms that it could assume.

The function of the first elevator chain 67 is, of course, to move ears rearwardly from the gathering and snapping mechanism 46 to husking mechanism, indicated generally by the numeral 70 for the left hand unit 20. Similar husking mechanism is provided for the right hand unit 21 and is designated generally by the numeral 71. Since each husking mechanism is symmetrical, only the left hand mechanism will be described. The mechanism in the present case is shown only briefly and generally as including a pair of rearwardly and upwardly inclined husking rolls, the inner husking roll being designated by the numeral 72 and the outer roll by the numeral 73. The rotating axes of the husking rolls are parallel and in a common plane that inclines fore and aft and that is parallel to the axes A and B of the snapping rolls. The arrangement is such that the forward ends of the husking rolls are proximate to the rear ends of the snapping rolls; although, it is immaterial whether the rolls overlap as in the case of some prior constructions. The axis B of the outer snapping roll and the rotating axis of the inner husking roll 72 are in a common fore and aft extending vertical plane. The axis A of the inner snapping roll is offset laterally to one side of this plane and the axis of the outer husking roll 73 is offset to the other side of the plane, a relationship that is best illustrated in Figure 5. The arrangement is also such that the rear end of the ear trough 69 terminates substantially at the forward end of the outer husking roll 73. It will be further noted that the inner flight or run of the first elevator chain 67 operates over and closely above and parallel to the outer husking roll 73. The first elevator therefore serves not only as means for moving ears upwardly from the snapping rolls to the husking rolls but also as means for moving ears upwardly and rearwardly over at least the outer husking roll 73.

The forward ends of the husking rolls 72 and 73 may be appropriately journaled in a suitable bearing 74 (Figure 2) carried by the frame structure including the members 42 and 44. The upper ends of the husking rolls are journaled in a forward wall portion of the left hand gear casing or housing 26. The inner husking roll 72 includes a short shaft section 75 preferably integral therewith and extending within the housing 26, at which point it has keyed thereto a gear 76 (indicated in dotted lines in Figure 4). The outer husking roll is provided with a similar shaft section 77 which extends within the housing 26 and has keyed thereto a gear 78, best seen in Figures 2 and 4. The gears 76 and 78 are in constant mesh and serve to provide means for rotating the husking rolls 72 and 73 in opposite directions toward each other, as is conventional.

For the purpose of assisting in the delivery of ears of corn from the snapping rolls to the husking rolls and further for the purpose of moving said ears over the husking rolls, I provide my improved ear-forwarding or crop-handling device, which here preferably takes the form of a rotatable auger 79 carried on a shaft 80, the forward end portion of which includes a power output element for establishing a driving connection with the outer snapping roll 49, preferably by means of being connected thereto as at 81. The outer snapping roll 49 and the auger 79 are coaxial and the auger extends rearwardly from the snapping roll 49 substantially as a continuation or extension thereof. Since the rotating axis of the outer snapping roll 49 is above the rotating axis of the inner husking roll 72, the auger 79 will operate above the husking rolls and particularly directly above the inner husking roll 72. The auger 79 thus cooperates with the first elevator chain 67 not only to move ears rearwardly and upwardly from the snapping rolls to the husking rolls but also as means to move ears rearwardly and upwardly over the husking rolls toward the discharge end thereof at the rear portion of the housing 26.

The rear end of the auger shaft 80 enters an upper enclosure extension of the housing 26 (Figure 4) and has keyed thereto within the housing a gear 82. This gear is in constant mesh with a gear 83 keyed to the inner husking roll shaft 75 or otherwise mounted for rotation with the inner husking roll gear 76. The other husking roll shaft 77 has keyed thereto a bevel pinion 84 which meshes with a bevel pinion 85 keyed to the shaft 38 within the housing 26. From the description thus far it will be seen that the drive for the various mechanisms proceeds from the power shaft 38 through the bevel pinion 63 and bevel pinion 64 to the first elevator chain 67 and thence by means of the sprocket 59 to the outer gatherer chain 53. The bevel pinion 85 on the shaft 38 drives the bevel pinion 84 on the outer husking roll shaft 77 and through the gears 78 and 76 rotates the husking rolls 72 and 73. At the same time the gears 82 and 83 rotate the auger shaft 80 and auger 79. Since the lower end of the auger shaft 80 is connected in driving relation to the upper or rearward end of the outer snapping roll 49, the snapping roll 49 is simultaneously rotated in the same direction as the auger 79. The inner snapping roll 48 is driven from the outer snapping roll by means of the gears 50 and 51 and the gear 57 serves to drive the gearing in the gear box 55 for driving the inner gatherer chains 52. It will thus be seen that the auger 79 not only accomplishes the crop-handling functions previously attributed to it but serves also as a power-transmitting or driving means between the gearing housing 26 and the snapping rolls 48 and 49, from which drive is further taken to the inner gatherer chains 52. In other words, the gathering and snapping mechanism is driven by means of the rotatable drive mechanism including the shaft 38 through the medium of drive mechanism including the husking roll gears 76 and 78 and the ear-moving auger 79.

The tractor is here shown as equipped with shielding providing a central divider or gatherer point structure 86. The left hand harvesting unit 20 is provided with appropriate shielding structure 87 including an outer gatherer point 88 and the right hand harvesting unit 21 is provided with comparable units 89 and 90.

Figure 2:
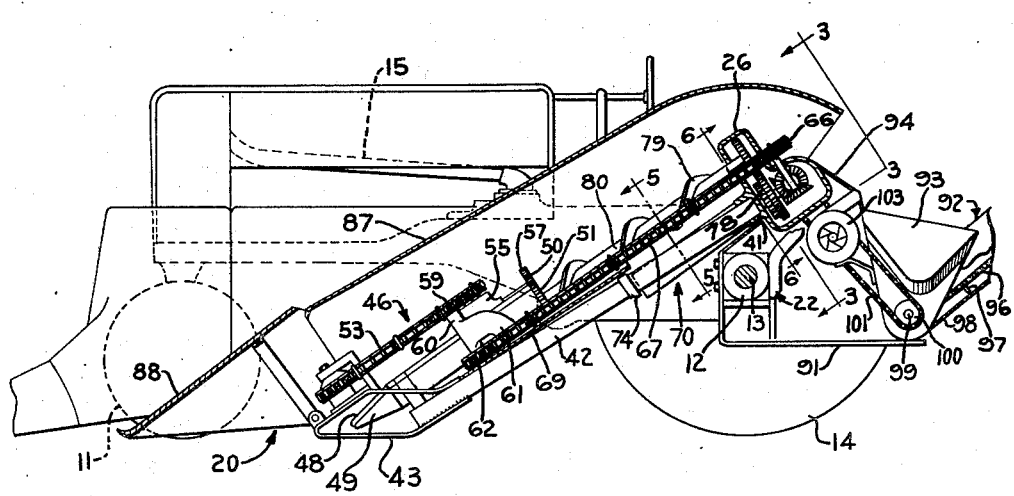
Figure 2 is a general side elevational view, partly in section, as viewed along the line 2—2 of Figure 1.

The supporting structures 22 and 24 have depending therefrom and extending rearwardly a support member 91 which carries the lower end of a wagon elevator, indicated generally by the numeral 92. This elevator is associated with hopper structure 93 arranged in position to receive ears from the discharge end of the husking mechanisms 70 and 71. It will be noted that the gear casings 26 and 37 are shaped to accommodate the discharge of ears from the rear ends of the husking rolls in the husking mechanism. The forward and outer portions of the hopper 93 are inclined toward the housings 26 and 37, respectively, as at 94 and 95, so that ears discharged at the rear ends of the husking mechanisms may drop directly into the hopper 93, to be carried by the inclined portions of the hopper to the central portion thereof, at which point they are picked up by the wagon elevator structure 92, the wagon elevator including an endless conveyor 96 here shown as of the type including a plurality of transverse slats 97 which cooperate with a bottom 98 in the wagon elevator housing (Figure 2). The endless conveyor 96 is carried at its lower end by suitable sprockets (not shown) keyed to a transverse shaft 99 having at its outer end a sprocket 100 driven by a roller chain 101 trained thereabout and about a sprocket 102 (Figures 3 and 4) keyed to the transverse driving shaft 38. A blower fan 103, which may be of any conventional construction, may be associated with the hopper structure 93 in any well known manner for the purpose of delivering a blast of air through the discharged ears of corn to separate therefrom chaff and other foreign material that may not have been separated from the ears during the passage thereof over the snapping and husking rolls.

It is believed that the operation of the structure will be apparent from the foregoing description of the construction thereof. It is also believed that the many important details of the invention have been pointed out in connection with the description of the various mechanisms. Other features of the invention will undoubtedly occur to those skilled in the art, as will several obvious modifications in the adaptation of the invention to harvesters of other types, all of which modifications and alterations may be made without departing from the spirit and scope of the invention as defined in the appended claims.

I claim:

1. In a corn harvester of the type having a pair of generally fore and aft extending rotatable snapping rolls and a pair of generally fore and aft extending husking rolls including portions aft of the snapping rolls and rotating on axes generally parallel to extensions of the snapping roll axes in corn-ear-receiving relationship to the snapping rolls, the improvement comprising: a generally fore and aft extending rotatable element having a portion separate from and arranged aft of the snapping rolls and paralleling the husking rolls in such close relationship to at least one of said husking rolls as to engage ears lying along said husking roll, said element being rotatable on an axis that is generally a continuation of the axis of one of the snapping rolls; and a driving connection for establishing drive between said one snapping roll and the rotatable element.

2. The invention defined in claim 1, further characterized in that: said rotatable element is positionable in substantially coaxial end-to-end relationship with said one snapping roll and the driving connection includes a shaft coaxial with and between the proximate ends of said roll and element for drivingly interconnecting the two.

3. The invention defined in claim 2, further characterized in that: the rotatable element includes an auger coaxial therewith.

4. In a corn harvester: fore and aft extending frame structure; gathering and snapping mechanism on the frame structure, including a pair of rearwardly and upwardly inclined rotatable snapping rolls having snapping elements thereon; husking mechanism on the frame structure rearwardly of and positioned to receive snapped corn from the gathering and snapping mechanism, including a pair of rearwardly and upwardly inclined rotatable husking rolls having their forward ends adjacent to and their major effective husking portions rearwardly of the rear ends of the snapping rolls and rotatable on axes lying in a fore and aft inclined plane generally below the axes of the snapping rolls; a first ear-conveying means for effecting delivery of corn rearwardly from the gathering and snapping mechanism to the husking mechanism, including an endless conveyor extending fore and aft between the gathering and snapping mechanism and the husking mechanism and lying closely above at least one of the husking rolls; and a second ear-conveying means separate from the snapping elements on the snapping rolls for assisting delivery of corn from the gathering and snapping mechanism to the husking mechanism, including a rotatable auger generally coaxial with one of the snapping rolls and extending rearwardly and upwardly from the rear end of said one snapping roll and closely above and in corn-ear-engaging relation to at least the other of the husking rolls.

5. In a corn harvester: fore and aft extending frame structure; gathering and snapping mechanism on the frame structure, including a pair of rearwardly and upwardly inclined rotatable snapping rolls having snapping elements thereon; husking mechanism on the frame structure rearwardly of and positioned to receive snapped corn from the gathering and snapping mechanism, including a pair of rearwardly and upwardly inclined rotatable husking rolls rotatable on axes lying in a fore and aft inclined plane generally below the axes of the snapping rolls; a first ear-conveying means for effecting delivery of corn rearwardly from the gathering and snapping mechanism to the husking mechanism and extending fore and aft between the gathering and snapping mechanism and the husking mechanism and lying closely above at least one of the husking rolls; and a second ear-conveying means separate from the snapping elements on the snapping rolls for assisting delivery of corn from the gathering and snapping mechanism to the husking mechanism, including a rotatable auger generally coaxial with one of the snapping rolls and extending rearwardly and upwardly from the rear end of said one snapping roll and closely above and in corn-ear-engaging relation to at least the other of the husking rolls.

6. In a corn harvester: fore and aft extending frame structure; gathering and snapping mechanism on the frame structure, including a pair of rearwardly and upwardly inclined snapping rolls rotatable on laterally spaced, generally parallel axes and having snapping elements thereon; husking mechanism on the frame structure rearwardly of and positioned to receive snapped corn from the gathering and snapping mechanism, including a pair of rearwardly and upwardly inclined rotatable husking rolls having their forward ends adjacent to and their major effective husking portions rearwardly of the rear ends of the snapping rolls and rotatable on generally parallel laterally spaced axes lying in a fore and aft inclined plane generally below the axes of the snapping rolls, the snapping and husking rolls being so arranged that the axis of one snapping roll and the axis of one husking roll lie in a common generally vertical fore and aft plane and the axis of the other snapping roll and the axis of the other husking roll are laterally offset respectively on opposite sides of said plane; a first ear-conveying means for effecting delivery of corn rearwardly from the gathering and snapping mechanism to the husking mechanism and extending fore and aft between the gathering and snapping mechanism and the husking mechanism and lying closely above the aforesaid offset husking roll; and a second ear-conveying means separate from the snapping elements on the snapping rolls for assisting delivery of corn from the gathering and snapping mechanism to the husking mechanism, including a rotatable auger generally coaxial with the snapping roll that has its axis in the aforesaid vertical plane and extending rearwardly and upwardly from the rear end of said one snapping roll and closely above and in corn-ear-engaging relation to the husking roll that has its axis in said vertical plane.

7. The invention defined in claim 6, further characterized in that: said snapping roll with which the auger is generally coaxial further including at its rear end a shaft part rotatable therewith and connected to and rotatable with the auger so that said snapping roll and auger are conjointly rotatable.

8. In a corn harvester: fore and aft extending frame structure; gathering and snapping mechanism on the frame structure, including a pair of rearwardly and upwardly inclined snapping rolls rotatable on laterally spaced, generally parallel axes and having snapping elements thereon; husking mechanism on the frame structure rearwardly of and positioned to receive snapped corn from the gathering and snapping mechanism, including a pair of rearwardly and upwardly inclined rotatable husking rolls having their forward ends adjacent to and their major effective husking portions rearwardly of the rear ends of the snapping rolls and rotatable on generally parallel laterally spaced axes lying in a fore and aft inclined plane generally below the axes of the snapping rolls, the snapping and husking rolls being so arranged that the axis of one snapping roll and the axis of one husking roll lie in a common generally vertical fore and aft plane and the axis of the other snapping roll and the axis of the other husking roll are laterally offset respectively on opposite sides of said plane; and ear-conveying means separate from the snapping elements on the snapping rolls for delivering corn from the gathering and snapping mechanism to the husking mechanism, including a rotatable auger generally coaxial with the snapping roll that has its axis in the aforesaid vertical plane and extending rearwardly and upwardly from the rear end of said one snapping roll and closely above and in corn-ear-engaging relation to the husking roll that has its axis in said vertical plane.

9. A corn harvester for a tractor of the type having a longitudinal body carried on a transverse axle structure having relatively widely spaced wheels, said tractor further having a power source including a belt pulley rotatable on a transverse axis comprising: a fore and aft frame mountable between the tractor body and one of said wheels; means for connecting the frame to the transverse axle structure, including a pivot on a transverse axis; gathering and snapping mechanism carried by the frame; and means for driving the gathering and snapping mechanism, including a drive element rotatable on the aforesaid transverse pivot axis, a belt pulley on said element, and a belt for connecting said pulley and the tractor belt pulley.

10. The invention defined in claim 9, further characterized in that: the means for connecting the frame to the tractor axle structure includes a gear housing; gearing is carried in said housing and is operatively connected to said drive element; and a generally fore and aft extending rotatable drive member is operatively connected between said gearing and the gathering and snapping mechanism.

11. The invention defined in claim 9, further characterized in that: the gathering and snapping mechanism is at the forward end of the frame and the drive element is at the rear end; husking mechanism is carried by the frame and disposed between the gathering and snapping mechanism and the drive element; drive means is operatively connected between the drive element and the husking mechanism for driving the latter from the former; and drive means is operatively connected between the husking mechanism and the gathering and snapping mechanism for driving the latter from the former.

12. The invention defined in claim 9, further characterized in that: the gathering and snapping mechanism is at the forward end of the frame and the drive element is at the rear end; husking mechanism is carried by the frame and disposed between the gathering and snapping mechanism and the drive element; ear-handling means is provided between the gathering and snapping mechanism and the husking mechanism for delivering ears from the former to the latter including an ear-moving element rotatable on a fore and aft extending axis and operatively connected at its opposite ends respectively in driving relation to the drive element and to the gathering and snapping mechanism so that the former drives the latter through said element.

13. A corn harvester for a tractor of the type having a longitudinal body provided with a power source including a belt pulley rotatable on a transverse axis comprising: a fore and aft frame mountable between the tractor body and one of said wheels; means for connecting the frame to the tractor, including a pivot on a transverse axis; gathering and snapping mechanism carried by the frame; and means for driving the gathering and snapping mechanism, including a drive element rotatable on the aforesaid transverse pivot axis, a belt pulley on said element and a belt for connecting said pulley and the tractor belt pulley.

14. In a corn harvester having a pair of generally fore and aft extending snapping rolls and means rearwardly thereof for receiving snapped ears therefrom, the improvement residing in means for moving ears rearwardly from the snapping rolls to the receiving means, comprising: an auger separate from and coaxial with one of the snapping rolls and extending rearwardly from the snapping rolls and beyond the ends of both of them to the receiving means and having means for direct driving connection to a rear end portion of one of said snapping rolls.

15. In a corn harvester having a pair of generally fore and aft extending snapping rolls and means rearwardly thereof for receiving snapped ears therefrom, the improvement residing in means for moving ears from the snapping rolls to the receiving means, comprising: an auger separate and extending rearwardly from and having means for connection in driving relation to one of the snapping rolls in generally coaxial relation thereto and axially beyond the ends of the effective snapping portions of both rolls toward the receiving means.

16. In a corn harvester of the type having a pair of generally fore and aft extending rotatable snapping rolls and a pair of husking rolls including rotatable portions aft of the snapping rolls, the improvement comprising: a generally fore and aft extending rotatable element separate from and having a portion arranged aft of the snapping rolls and in corn-ear-engaging relationship to the husking rolls and rotatable on an axis that is generally a continuation of the axis of one of the snapping rolls; and a driving connection for establishing drive between said one snapping roll and the rotatable element.

17. In a corn harvester having a frame carrying a pair of fore and aft extending husking rolls and ear-receiving means rearwardly of and below the rear ends of the husking rolls, the improvement comprising: housing means mountable at the rear ends of the husking rolls and including bearings for journaling said rear ends of the husking rolls, said housing having a first upper portion positionable in a plane substantially including the tops of said rolls so that ears moved rearwardly over the rolls may pass over said housing portion to the ear-receiving means; first ear-moving means movable rearwardly over one husking roll in a plane above said housing portion, and mounted in part on said housing portion; second ear-moving means including a fore and aft extending auger rotatable on an axis above and parallel to the other husking roll; a second upper portion on said housing in the form of an enclosure above the plane of said first housing portion and laterally offset therefrom for journaling the rear end of said auger; and driving means enclosed in said housing and enclosure including drive elements for driving the husking rolls and both ear-moving means, and power input means projecting exteriorly of the housing means.

18. In a corn harvester having a frame carrying snapping means, fore and aft extending husking rolls rearwardly of the snapping means, and ear-receiving means rearwardly of and below the rear ends of the husking rolls, housing means mountable at the rear ends of the husking rolls and including bearings for journaling said rear ends of the husking rolls, said housing having a first upper portion positionable in a plane substantially including the tops of said rolls so that ears moved rearwardly over the rolls may pass over said housing portion to the ear-receiving means; first ear-moving means movable rearwardly over one husking roll in a plane above said housing portion, and mounted in part on said housing portion; second ear-moving means including a fore and aft extending auger rotatable on an axis above and parallel to the other husking roll; a second upper portion on said housing in the form of an enclosure above the plane of said first housing portion and laterally offset therefrom for journaling the rear end of said auger; driving means enclosed in said housing and enclosure including drive elements for driving the husking rolls and both ear-moving means, and power input means projecting exteriorly of the housing means; and power output means on the forward end of the auger including a driving connection for driving the snapping means so that said auger serves as a power-transmitting element between said power input means and the snapping means.

NORMAN F. ANDREWS.

REFERENCES CITED

The following references are of record in the file of this patent:

UNITED STATES PATENTS

| Number | Name | Date |
| --- | --- | --- |
| 808,465 | Meader | Dec. 26, 1905 |
| 846,049 | Pearson | Mar. 5, 1907 |
| 1,002,530 | Legg et al. | Sept. 5, 1911 |
| 1,840,336 | Threewits et al. | Jan. 12, 1932 |
| 1,857,907 | York | May 10, 1932 |
| 1,898,757 | Bockmann | Feb. 21, 1933 |
| 2,219,483 | Lukes | Oct. 29, 1940 |
| 2,351,515 | Hyman et al. | June 13, 1944 |
| 2,431,016 | Andrews | Nov. 18, 1947 |